US008391775B2

(12) United States Patent
Moinzadeh et al.

(10) Patent No.: US 8,391,775 B2
(45) Date of Patent: Mar. 5, 2013

(54) MOBILE DIGITAL RADIO PLAYLIST SYSTEM

(75) Inventors: Kamyar Moinzadeh, Bellevue, WA (US); Leon Hong, Sammamish, WA (US); Tom Shigeno, Seattle, WA (US); David Quimby, Seattle, WA (US)

(73) Assignee: Airbiquity Inc., Seattle, WA (US)

( * ) Notice: Subject to any disclaimer, the term of this patent is extended or adjusted under 35 U.S.C. 154(b) by 1328 days.

(21) Appl. No.: 12/043,933

(22) Filed: Mar. 6, 2008

(65) Prior Publication Data

US 2008/0218409 A1 Sep. 11, 2008

Related U.S. Application Data

(60) Provisional application No. 60/894,160, filed on Mar. 9, 2007.

(51) Int. Cl.
*H04H 40/00* (2008.01)
*H04M 3/42* (2006.01)
*H04M 3/493* (2006.01)

(52) U.S. Cl. .................. 455/3.06; 455/414.2

(58) Field of Classification Search ............ 455/41.2, 455/41.3, 3.06, 3.04, 3.03, 509, 414.1, 414.2, 455/66.1, 440, 456.1, 456.3, 414.3, 414.4; 709/231, 232
See application file for complete search history.

(56) References Cited

U.S. PATENT DOCUMENTS

| | | | |
|---|---|---|---|
| 5,898,910 A | 4/1999 | Miyake et al. |
| 6,105,063 A | 8/2000 | Hayes, Jr. |
| 6,148,253 A | 11/2000 | Taguchi |
| 6,175,789 B1 | 1/2001 | Beckert |
| 6,356,812 B1 | 3/2002 | Cragun |
| 6,434,450 B1 | 8/2002 | Griffin, Jr. |
| 6,487,717 B1 | 11/2002 | Brunemann |
| 6,553,375 B1 | 4/2003 | Huang |
| 6,578,047 B1 | 6/2003 | Deguchi |
| 6,650,534 B2 | 11/2003 | Tree |
| 6,799,201 B1 | 9/2004 | Lee |
| 6,812,942 B2 | 11/2004 | Ribak |
| 6,853,910 B1 | 2/2005 | Oesterling |
| 6,895,316 B2 | 5/2005 | Chen |
| 6,915,176 B2 | 7/2005 | Novelli et al. |

(Continued)

FOREIGN PATENT DOCUMENTS

| | | |
|---|---|---|
| CA | 2242495 | 1/2000 |
| DE | 102 26 425 A1 | 12/2003 |

(Continued)

OTHER PUBLICATIONS

United States Patent and Trademark Office ISA; PCT International Search Report; Jun. 30, 2008; 2 Pages.

(Continued)

*Primary Examiner* — Eugene Yun
(74) *Attorney, Agent, or Firm* — Stolowitz Ford Cowger LLP

(57) ABSTRACT

Methods and apparatus are disclosed for implementing a mobile digital radio playlist system. The playlist need not be maintained in a vehicle; preferably it is maintained on a user's equipment such as a computer, PDA, MP3 player or the like. The system enables a method of updating such a playlist conveniently, for example while traveling in a vehicle, by capturing indicia of a current song in a mobile digital radio receiver in response to a user capture input; transmitting the captured indicia from the digital radio receiver to a wireless telecommunication device; in the wireless telecommunication device, forwarding the captured indicia to a playlist server; and in the playlist server, forwarding the received indicia to the user's equipment to update the playlist.

13 Claims, 4 Drawing Sheets

U.S. PATENT DOCUMENTS

| | | | |
|---|---|---|---|
| 6,961,536 B2 | 11/2005 | Himmel | |
| 6,973,476 B1 | 12/2005 | Naden | |
| 7,053,866 B1 | 5/2006 | Mimran | |
| 7,062,528 B2 | 6/2006 | Deguchi | |
| 7,107,234 B2 | 9/2006 | Deguchi | |
| 7,127,454 B2 | 10/2006 | Deguchi | |
| 7,139,660 B2 | 11/2006 | Sarkar | |
| 7,190,798 B2 | 3/2007 | Yasuhara | |
| 7,190,971 B1 | 3/2007 | Kawamoto | |
| 7,218,925 B2 | 5/2007 | Crocker | |
| 7,251,473 B2 | 7/2007 | Alrabady | |
| 7,327,228 B2 | 2/2008 | Min | |
| 7,334,041 B2 | 2/2008 | Swindells | |
| 7,346,435 B2 | 3/2008 | Amendola | |
| 7,362,239 B2 | 4/2008 | Franczyk | |
| 7,363,357 B2 | 4/2008 | Parupudi | |
| 7,366,892 B2 | 4/2008 | Spaur | |
| 7,379,541 B2 | 5/2008 | Iggulden | |
| 7,398,055 B2 | 7/2008 | Tajima | |
| 7,437,183 B2 | 10/2008 | Makinen | |
| 7,461,122 B2 | 12/2008 | Kawana | |
| 7,467,028 B2 | 12/2008 | Pilgrim | |
| 7,480,512 B2 * | 1/2009 | Graham et al. | 455/456.3 |
| 7,505,732 B2 | 3/2009 | McDonough | |
| 7,552,009 B2 | 6/2009 | Nelson | |
| 7,613,564 B2 | 11/2009 | Vorona | |
| 7,623,949 B2 | 11/2009 | Nou | |
| 7,634,095 B2 | 12/2009 | Arun | |
| 7,643,788 B2 | 1/2010 | Habaguchi | |
| 7,643,913 B2 | 1/2010 | Taki | |
| 7,657,368 B2 | 2/2010 | Weiss | |
| 7,676,830 B2 | 3/2010 | Kuz | |
| 7,684,908 B1 | 3/2010 | Ogilvie | |
| 7,693,612 B2 | 4/2010 | Bauchot | |
| 7,805,542 B2 | 9/2010 | Hindman | |
| 7,812,712 B2 | 10/2010 | White | |
| 7,815,100 B2 | 10/2010 | Adams | |
| 7,826,945 B2 | 11/2010 | Zhang | |
| 7,885,599 B2 | 2/2011 | Yuhara | |
| 7,917,644 B2 * | 3/2011 | Vedantham et al. | 709/231 |
| 7,970,436 B1 | 6/2011 | Katzer | |
| 8,014,915 B2 | 9/2011 | Jeon | |
| 2002/0087655 A1 | 7/2002 | Bridgman | |
| 2002/0091848 A1 | 7/2002 | Agresta | |
| 2003/0003892 A1 | 1/2003 | Makinen | |
| 2003/0088619 A1 | 5/2003 | Boundy | |
| 2003/0147534 A1 | 8/2003 | Ablay | |
| 2003/0195925 A1 | 10/2003 | Kaneko | |
| 2004/0002938 A1 | 1/2004 | Deguchi | |
| 2004/0209614 A1 | 10/2004 | Bright et al. | |
| 2004/0259545 A1 | 12/2004 | Morita | |
| 2005/0031100 A1 | 2/2005 | Iggulden | |
| 2005/0060350 A1 | 3/2005 | Baum et al. | |
| 2005/0085965 A1 | 4/2005 | Issa | |
| 2005/0132024 A1 | 6/2005 | Habaguchi | |
| 2005/0216553 A1 | 9/2005 | Mallonee | |
| 2005/0216855 A1 | 9/2005 | Kopra et al. | |
| 2005/0216902 A1 | 9/2005 | Schaefer | |
| 2005/0221878 A1 | 10/2005 | Van Bosch | |
| 2005/0278080 A1 | 12/2005 | Pilgrim | |
| 2005/0283284 A1 | 12/2005 | Grenier | |
| 2006/0015221 A1 | 1/2006 | Sarkar | |
| 2006/0025897 A1 | 2/2006 | Shostak | |
| 2006/0025907 A9 | 2/2006 | Kapolka | |
| 2006/0036356 A1 | 2/2006 | Rasin | |
| 2006/0041337 A1 | 2/2006 | Augsburger | |
| 2006/0141962 A1 | 6/2006 | Forbes | |
| 2006/0161312 A1 | 7/2006 | Juengling | |
| 2006/0253874 A1 | 11/2006 | Stark et al. | |
| 2007/0005206 A1 | 1/2007 | Zhang | |
| 2007/0021885 A1 | 1/2007 | Soehren | |
| 2007/0043829 A1 | 2/2007 | Dua | |
| 2007/0100513 A1 | 5/2007 | Asano | |
| 2007/0100766 A1 | 5/2007 | Healy et al. | |
| 2007/0126604 A1 | 6/2007 | Thacher | |
| 2007/0143798 A1 | 6/2007 | Jira | |
| 2007/0200663 A1 | 8/2007 | White | |
| 2007/0208464 A1 | 9/2007 | Moorhead | |
| 2007/0265744 A1 | 11/2007 | Nicolai | |
| 2007/0265745 A1 | 11/2007 | Styles | |
| 2007/0272423 A1 | 11/2007 | Cutler | |
| 2007/0281606 A1 | 12/2007 | Baunach | |
| 2008/0005733 A1 | 1/2008 | Ramachandran | |
| 2008/0007120 A1 | 1/2008 | Weyl | |
| 2008/0071882 A1 | 3/2008 | Hering | |
| 2008/0143497 A1 | 6/2008 | Wasson et al. | |
| 2008/0172147 A1 | 7/2008 | Taki | |
| 2008/0214236 A1 | 9/2008 | Harb | |
| 2008/0248742 A1 | 10/2008 | Bauer | |
| 2008/0249886 A1 | 10/2008 | Woodard | |
| 2008/0266051 A1 | 10/2008 | Taki | |
| 2008/0268810 A1 | 10/2008 | Kobayashi | |
| 2008/0269961 A1 | 10/2008 | Shitanaka | |
| 2009/0075624 A1 | 3/2009 | Cox | |
| 2009/0079555 A1 | 3/2009 | Aguirre De Carcer | |
| 2009/0119657 A1 | 5/2009 | Link, II | |
| 2009/0128286 A1 | 5/2009 | Vitito | |
| 2009/0138942 A1 | 5/2009 | Alrabady | |
| 2009/0168742 A1 | 7/2009 | Sumcad | |
| 2009/0204815 A1 | 8/2009 | Dennis | |
| 2009/0215466 A1 | 8/2009 | Ahl | |
| 2009/0265173 A1 | 10/2009 | Madhavan | |
| 2009/0265633 A1 | 10/2009 | Lim | |
| 2009/0265701 A1 | 10/2009 | Naslavsky | |
| 2009/0300595 A1 | 12/2009 | Moran | |
| 2010/0037057 A1 | 2/2010 | Shim | |
| 2010/0082559 A1 | 4/2010 | Sumcad | |
| 2010/0088367 A1 | 4/2010 | Brown | |
| 2010/0115505 A1 | 5/2010 | Touati | |
| 2010/0125387 A1 | 5/2010 | Sehyun | |
| 2010/0153207 A1 | 6/2010 | Roberts | |
| 2010/0222939 A1 | 9/2010 | Namburu | |
| 2010/0235045 A1 | 9/2010 | Craig | |
| 2011/0038307 A1 | 2/2011 | Madhavan | |

FOREIGN PATENT DOCUMENTS

| | | |
|---|---|---|
| DE | 10 2005 044943 A1 | 3/2006 |
| EP | 0 978 433 A2 | 2/2000 |
| EP | 1 125 784 A2 | 8/2001 |
| EP | 1 205 883 A1 | 6/2008 |
| EP | 2 012 090 A2 | 1/2009 |
| WO | WO 02/19116 A2 | 3/2002 |
| WO | 03/034235 | 4/2003 |
| WO | WO 2005/105509 A1 | 11/2005 |
| WO | WO 2006/023713 A2 | 3/2006 |
| WO | WO 2007/057895 A2 | 5/2007 |
| WO | WO/2007/092463 A2 | 8/2007 |
| WO | WO 2008/050136 A1 | 5/2008 |
| WO | WO 2008/055117 A2 | 5/2008 |
| WO | WO 2008/124795 A2 | 10/2008 |
| WO | WO 2009/016917 A1 | 2/2009 |
| WO | 2011046823 A2 | 4/2011 |
| WO | 2011047037 A1 | 4/2011 |
| WO | 2011047045 A1 | 4/2011 |
| WO | 2011047052 A1 | 4/2011 |
| WO | 2011047056 A1 | 4/2011 |

OTHER PUBLICATIONS

Supplementary European Search Report based on EP 06 71 9988 completed on Jun. 13, 2008.

"3rd Generation Partnership Project; Technical Specification Group Services and System Aspects Push Architecture (Release 6); 3GPP TR 23.976," ETSI Standards; v. 3-SA2, No. V6.1.0; pp. 1-34; Jun. 1, 2004.

"Hybrid Vehicular Display" UTC; Aug. 24, 2004; United States.

"Mobile Device used as an External Graphical User Interface for Telematics Hardware installed in a Car. Demonstrating Speeding control and Road User Charge;" Disclosed by IBM; UTC; Oct. 13, 2005.

"Vehicle Console Personalization" Aug. 10, 2006; UTC; United States.

Nilsson et al.; "Secure Firmware Updates Over the Air in Intelligent Vehicles," May 19-23, 2008.

Ryu et al,: "The Design of Remote Vehicle Management System Based on OMA DM Protocol and AUTOSAR S/W Architecture;" Jul. 23-25, 2008.

Anonymous: "NAVTEQ, Nokia and Magneti Marelli Integrate Smartphone Into Car Entertainment System," Internet citation, Sep. 17, 2009, pp. 1-3. Retrieved from the Internet: URL: http://www.gadgetpaper.com/navteq-nokia-and-magneti-marelli-integrate-smartphone-into-care-entertainment-system/ [retrieved on Jan. 28, 2011] p. 2, paragraph 1-3.

Alpine Electronics of America, Inc.; "Alpine Launches Mobile Phone Solution That Integrates With Car Audio Head Untis;" Dec. 23, 2009.

Visteon Corporation; "Visteon Helps Connect Drivers and Passengers to Their Vehicle . . . and Their Vehicle to the World," Jan. 7, 2010; http://www.prnewswire.com/news-releases/visteon-helps-connect-drivers-and-passengers-to-their-vehicles--and0-their-vehicles-to-the-world-80902587.html.

Marisetty et al., "An architecture for In-Vehicle Infotainment Systems," Jan. 29, 2010; URL: http://www.ddj.com/embedded-systems/222600438.

Global Patent Solutions LLC, "Search Report" for Search Name: Centralized Management of Motor Vehicle Software Applications and Services, Jul. 30, 2010.

International Search Report dated Dec. 15, 2010 for PCT/US10/52515.

International Search Report dated Dec. 20, 2010 for PCT/US2010/052511.

Global Patent Solutions LLC, "Additional Search Results" for Search Name: Centralized Management of Motor Vehicle Software Applications and Services, Dec. 27, 2010.

Global Patent Solutions LLC, "Additional Search Results" dated Feb. 5, 2011.

International Search Report dated Feb. 10, 2011 for PCT/US2010/052493.

International Search Report dated Feb. 10, 2011 for PCT/US2010/052502.

Global Patent Solutions LLC, "Additional Search Results" dated Feb. 10, 2011.

Stolowitz Ford Cowger LLP—List of Related Cases; Apr. 5, 2011.

European Patent Office; International Search Report and Written Opinion of the Searching Authority for PCT/US2009/062431; Jan. 25, 2010.

Fuchs et al. "End to End Content Delivery Using UPnP and WiFi Network." In: Connected Services in Mobile Networks—San Diego, CA, USA. Jan. 10-12, 2004. Retrieved on Jan. 7, 2012 from the internet at URL: <http://citeseerx.ist.psu.edu/viewdoc/download-?doi=10.1.1.110.7788&rep=rep1&type=pdf>. Entire document.

Supplementary European Search Report based on EP 08 73 1753 dated Sep. 19, 2012; 7 pages.

International Search Report for PCT/US2012/053977 dated Nov. 27, 2012; 2 pages.

* cited by examiner

FLOW DIAGRAM

| TIME | Playlist Web Portal System | IN Cell Phone | Satellite Radio |
|---|---|---|---|
| A | | Monitor Blue Tooth (BT) | Capture button press |
| B | | BT-receive capture signal | ← Send capture start |
| C | | | ← Send meta data |
| D | | Receive song meta data (BT) | |
| E | | Establish voice call automatically ... | |
| F | | ←→ (queue if phone busy) | |
| G | | ←→ to portal | |
| H | | ←→ Login, PW, etc. (IBS) | |
| I | Store: | Send Meta Data (IBS) (optionally send location) | |
| J | Add to playlist | | |
| K | Home/office- --Login | Ack, Takedown call | |
| L | --acquire music | | |
| M | -- EXECUTE PLAYLIST | | |

FIG. 3

MOBILE DIGITAL RADIO PLAYLIST SYSTEM

RELATED APPLICATIONS

This application claims priority from U.S. provisional application No. 60/894,160 filed Mar. 9, 2007 and incorporated herein by this reference.

COPYRIGHT NOTICE

© 2007-2008 Airbiquity Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

TECHNICAL FIELD

This invention pertains to mobile digital radio and more specifically pertains to managing playlists of songs or other recorded digital media.

BACKGROUND OF THE INVENTION

Satellite radio has been deployed in some motor vehicles and terrestrial broadcast digital radio is expected to follow soon. The mobile satellite digital radio receiver typically is integrated with traditional audio components such as AM/FM analog radio, CD player, MP3, and the like in a vehicle entertainment system. In some cases, wireless telecommunications (cell phones) are being integrated with vehicle entertainment systems as well, for example for "hands-free" operation. All of this functionality packed into a single unit makes for a complex user interface. Many users have not yet even learned how to find a station among the hundreds of satellite digital radio stations already available.

Sometimes, when a user hears a particular song over the satellite radio, they may wish to record that song for playback later. Commercial devices are known for this purpose, such as the "XM radio recorder" The XM radio recorder, essentially a digital audio recorder, is commercially available and can be connected to a satellite radio receiver (as shown in FIG. 1) for recording a song that is received over the satellite radio. Such a unit is relatively expensive, because it is proprietary, and it cannot be used for other purposes.

The need remains for a better way to capture a song (or speech, discussion or other audio broadcast item) played over the satellite radio, or to at least capture metadata that describes such a song, and incorporate it into a playlist so that it can be replayed or otherwise accessed later at other locations. The driver or other occupant of a vehicle ought to be able to capture that information very easily and inexpensively.

SUMMARY OF THE INVENTION

The following description discloses preferred embodiments that are illustrative of improved methods and systems for managing playlists of songs including songs that are heard over a digital radio receiver, for example, in a motor vehicle. Additional aspects and advantages of this invention will be apparent from the following detailed description of preferred embodiments, which proceeds with reference to the accompanying drawings.

BRIEF DESCRIPTION OF THE DRAWINGS

FIG. 3 is a communications flow diagram illustrating communications consistent with embodiments of the present invention among a satellite radio, a cell phone and a remote playlist portal system.

DETAILED DESCRIPTION OF PREFERRED EMBODIMENTS

Figure 1:
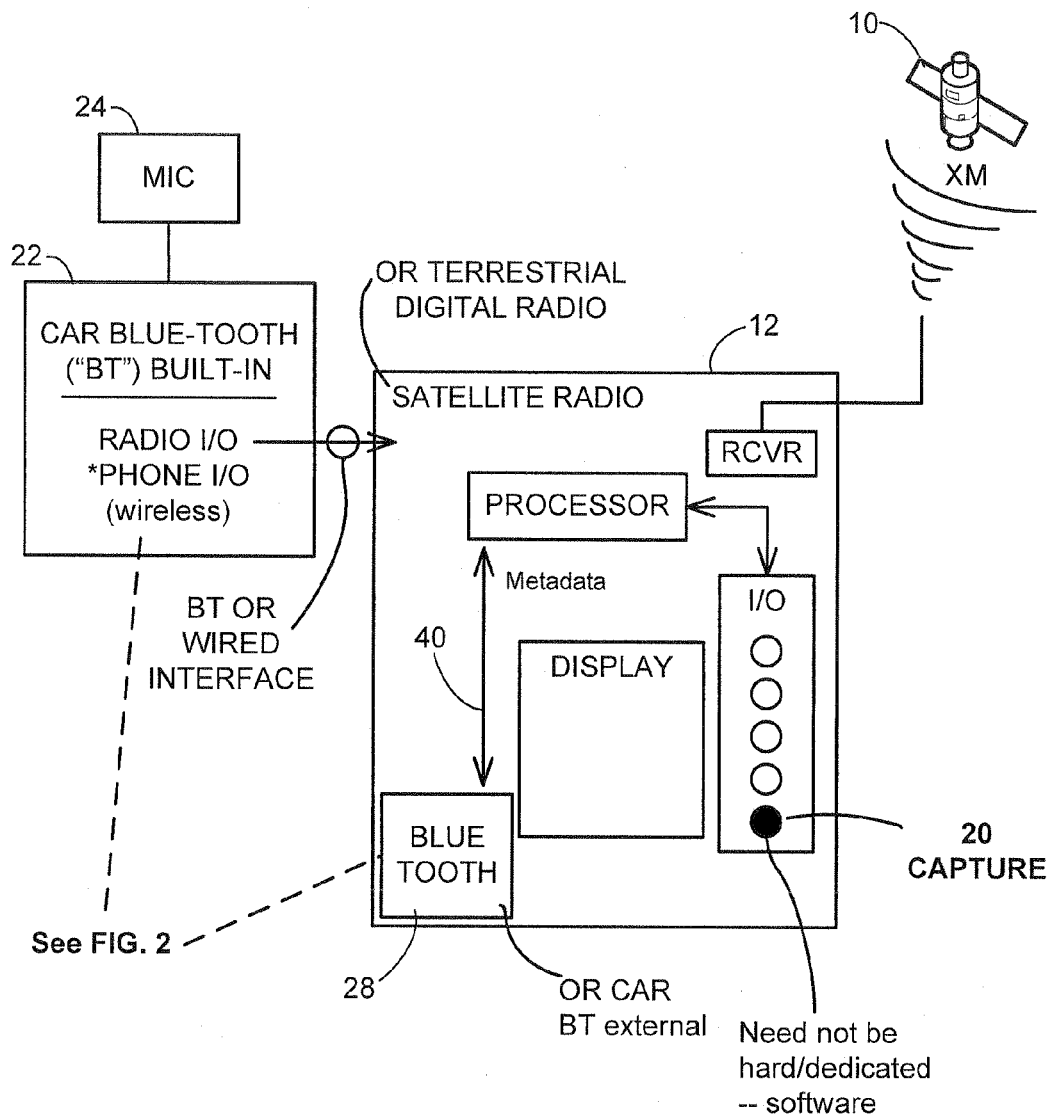
FIG. 1 is a simplified block diagram illustrating one example of a mobile digital radio system with Bluetooth and or wired interfaces.

In the following description, the selection and handling of a selected "song" and a "playlist" of songs are used as one example to illustrate principles of the invention in one application. It can also be applied to other examples of digital content, for example other audio speech, graphics or video material. For example, a certain newscast may be delivered over the radio, and the user may want to capture it for later listening at home. That media item, like a song, would fall well within the parameters of the present invention.

In accordance with the present disclosure, the "XM radio recorder" becomes unnecessary. Instead, in one embodiment of the present invention, a satellite radio user interface is modified to provide a "capture" button 20, which could be a dedicated button or software-configurable button in the user interface. When the user hears a song that he or she wants to capture, the user simply presses the button 20 on the satellite radio user interface. According to one embodiment, the music (audio content) of that song is not literally captured, but instead the name of the song and/or other metadata adequate to identify the song later, is captured, as further described herein.

Some automobiles have a built-in Bluetooth system, such as that shown in 22 "car Bluetooth built-in". For example, an automobile might have a Bluetooth system that provides a microphone 24 for connection to a cell phone for hands-free telephone calls. In one embodiment, the Bluetooth transceiver 22 may be hard-wired to the satellite radio 12. the term "hard wired" herein is not limited to a direct electrical connection. Rather, in some embodiments, a BT transceiver may be coupled to the radio via one or more in-vehicle networks or controllers. In an alternative embodiment, satellite radio 12 itself may have a Bluetooth transceiver 28 built into the radio for a similar purpose. Either the separate BT receiver 22 or the radio BT receiver 28 can be used to communicate with a user's cell phone as described herein.

Figure 2:
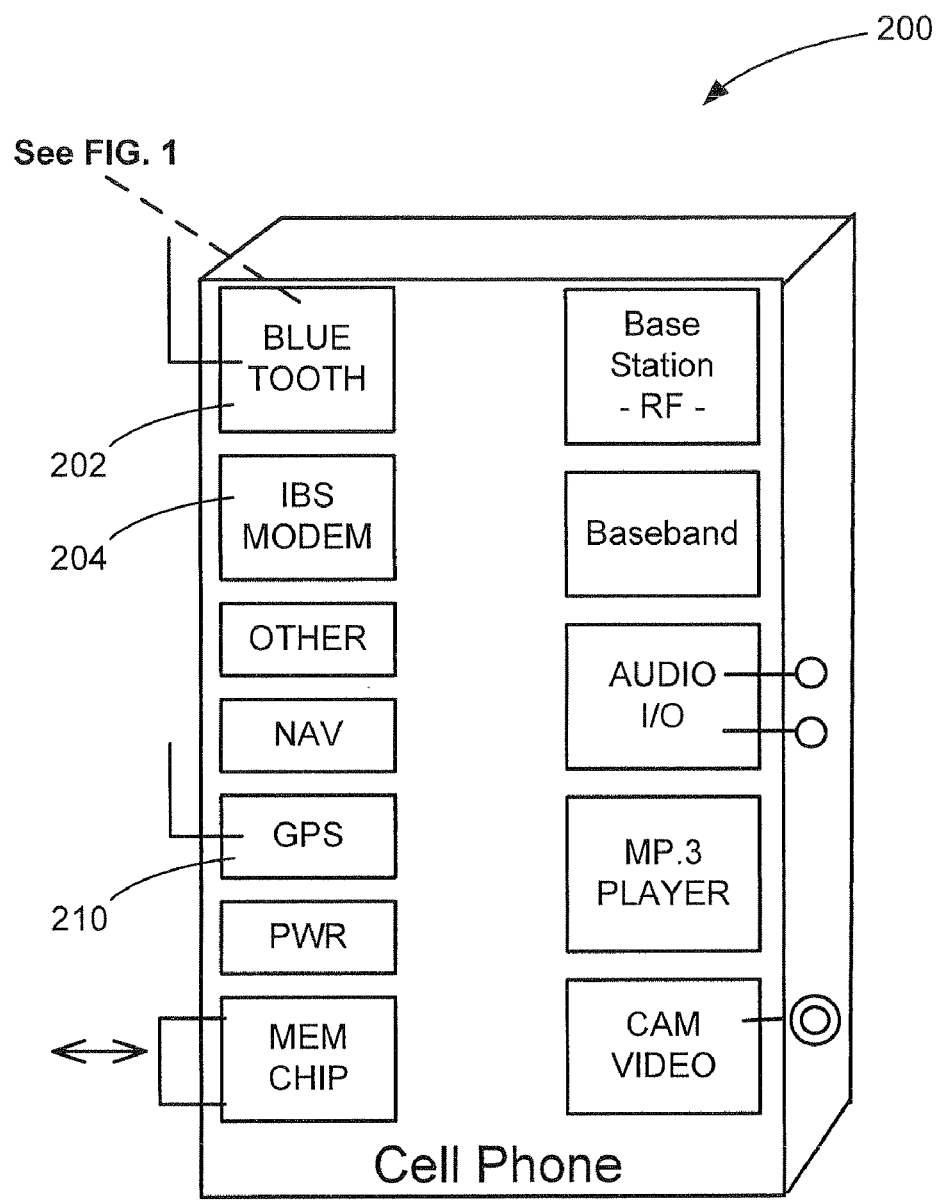
FIG. 2 is a simplified block diagram illustrating components of a cell phone.

In operation, when the user presses the capture button 20, the Bluetooth system (either the car system 22 or one integrated 28 in the satellite radio 12) initiates a message to the user's cell phone 200 in FIG. 2. The satellite radio preferably provides a transport layer software which utilizes the BT interface to deliver song information to the cell phone, and thence to the web portal or server over IBS, SMS, or packet data transport channels. In another embodiment, the metadata is sent to a server via in-band voice channel connection. The web portal (430 in FIG. 4) and server (410 in FIG. 4) are further discussed below.

A typical cell phone 200 is illustrated in a simplified functional block diagram form in FIG. 2. This cell phone includes a Bluetooth transceiver 202. In response to a predetermined activation signal over the wireless Bluetooth channel, the cell phone (together with embedded software) will download metadata (see reference 40 in FIG. 1) describing the current song from the satellite radio 12, and then transmit that metadata to a server or web portal for later use by the user as further described below. The "current song" refers to a song currently playing, or last played, on the digital radio.

Figure 4:
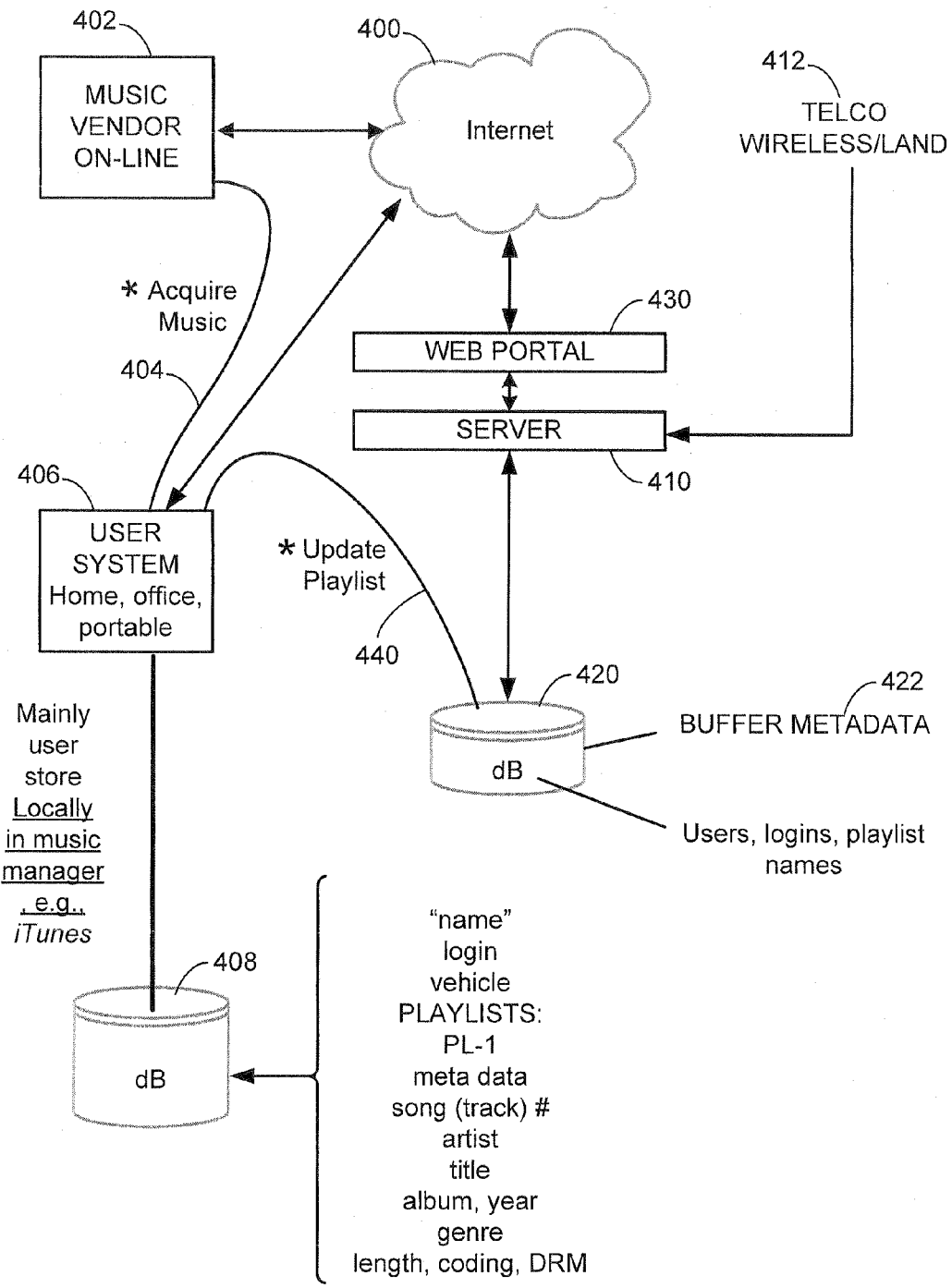
FIG. 4 presents a simplified, system level diagram of a playlist management system in accordance with one embodiment of the invention.

FIG. 4 presents a simplified, system level diagram of a playlist management system in accordance with one embodiment of the invention. In the figure, an on-line vendor of music 402 (e.g. Amazon.com, iTunes, etc.) has a web site available to the public via the Internet 400. Details of such connections, web sites, client-side web browsers, etc. are well known. Typically, a user can purchase and download desired music "on line" as indicated at reference 404. This is done using any suitable home or office computer 406, PC, laptop, PDA, etc. that has wired or wireless web access to the vendor 402. The user machine 406 has a data storage 408 (disk drive, flash drive, network storage, etc.), where it stores acquired music, other media items, and associated metadata. For example, music metadata can include for each item one or more of the song (track number), artist, title, album, year, genre, length, coding, and digital rights management (DRM) elements.

A web portal 430 consistent with the present disclosure also is accessible via the Internet 400, for example using a web page interface. The web portal 430 is coupled to a server 410 which provides the user services as described herein. The server 410 can also be coupled via suitable interface (not shown) to the telecommunications network 412, via landline (PSTN) and/or wireless connectivity to serve users via telecommunications. In particular, in a preferred embodiment, the user's cell phone 200 is used to communicate with the server 410 as further described with reference to FIG. 3 below. The cell phone acts as a conduit between the mobile digital radio 12 of FIG. 1 and the server 410. As noted, it preferably employs IBS, SMS, or packet data transport channels. However, the same principles can be adapted to follow future technical advances in wireless data communications, so the standards and protocols mentioned here should not be taken as limiting the scope of the invention.

The server 410 is coupled to a data store 420 for storing user names and accounts, logins, passwords, and actual playlists. Playlists preferably can be named by the corresponding user, and the user-selected playlist names stored in the data store as well, in association with the user. In addition, the data store 420 includes a metadata buffer 422 for storing metadata describing music or other media items. The metadata buffer need not be physically on the same data store. Music data, including metadata, can be transmitted from the buffer 422 to the user's equipment 406, for example via the server 410, web portal 430 and the Internet 400.

Referring again to FIG. 3, it shows a flow diagram of the principal communications of one embodiment, in simplified form. As noted, beginning at time "A" the user presses the capture button on the satellite radio, and the cell phone, as it is already "on" (monitoring the BT channel), then receives a blue tooth (BT) capture signal, time "B". (The time designations "A" through "M" in the figure are merely intended to convey a sequence of events, temporally from the top toward the bottom of the figure. The letters do not imply anything about duration of signals, delays, etc.) The satellite radio then communicates the current song metadata, time "C," over the blue tooth channel to the cell phone. The cell phone then establishes a voice call, beginning at time "D," over the voice channel of a digital wireless telecom network, to a web portal or other predetermined destination telephone number (e.g. server 410 in FIG. 4). The call can be queued or repeated to time "E" if the line is busy.

At time "F" the call is established between the cell phone and the playlist web portal system or server. The cell phone then goes through a log-in and password procedure with the web portal, at time "G" preferably using in-band signaling ("IBS"). In-band signaling refers to sending data over the voice channel of the wireless telecom network. This has advantages over digital data channels, as explained elsewhere. After a successful log-in, the cell phone software sends the captured metadata to the web portal at time "H". Optionally, it may also send the location of the vehicle at the time the song is captured. Location data can be acquired either by using a GPS receiver (210 in FIG. 2) on board the cell phone, or by acquiring it from a vehicle navigation system through a vehicle on-board network. After acknowledgement by the server of receipt of the data, the cell phone takes down the call.

At the web portal or server, the metadata is added to the user's playlist (420) see time "J". For example, this can default to a playlist associated with the user's vehicle. When the user returns to his home or office, see time "K," or other location where he has access to the web portal system, or music management software such as i-Tunes, he can take steps to download the corresponding song based on the metadata that has now been added to his playlist. In one embodiment, the playlist update is transmitted to the user equipment as indicated at 440 in FIG. 4. In practice, the data in one case would traverse the Internet. The user can then execute the updated playlist at any time ("M") to enjoy the song or other item first heard earlier via the satellite radio while traveling in the vehicle.

It should be noted that, in preferred embodiments, no special equipment is required in the automobile, other than a software change to the satellite radio to implement downloading metadata as described. Further, in a motor vehicle that does not have a built-in Bluetooth wireless system, that can be provided in the satellite radio. And, finally, the functionality of the cell phone of FIG. 2, as described herein, can be implemented through mere software changes to many known cell phones. Moreover, those software changes can be downloaded into the phone via a wireless call, or from another resource such as the web portal via the user equipment 406.

It will be obvious to those having skill in the art that many changes may be made to the details of the above-described embodiments without departing from the underlying principles of the invention. The scope of the present invention should, therefore, be determined only by the following claims.

The invention claimed is:

1. A method of updating a playlist stored on user equipment, the method comprising:

capturing indicia of a current song in a mobile digital radio receiver in response to a user capture input;

transmitting the captured indicia from the digital radio receiver to a wireless telecommunication device;

in the wireless telecommunication device, forwarding the captured indicia to a playlist server over a wireless telecom voice channel using in-band signaling;

automatically establishing a voice call to a predetermined telephone number corresponding to the playlist server in response to the user capture input if a line corresponding to the wireless telecommunication device is available;

modulating the captured metadata for in-band transmission over the wireless telecom voice channel of the established voice call and forwarding said modulated representation of the captured metadata in-band over the wireless telecom voice channel of the established voice call;

if the line is busy, queuing the captured metadata for a later transfer;

in the playlist server, forwarding the received indicia to the user equipment to update a playlist; and sending data indicative of a current location of the mobile digital radio receiver to the playlist server.

2. The method according to claim 1 wherein the wireless telecommunication device comprises a hand-held cell phone.

3. The method according to claim 1 wherein the wireless telecommunication device comprises a personal digital assistant.

4. The method according to claim 1 and further including acquiring the said location data from a GPS receiver.

5. The method according to claim 4 and further including acquiring the said location data in response to the said user capture input.

6. The method according to claim 1 and further including acquiring the said location data from a space based global navigation satellite system.

7. A mobile digital radio playlist system comprising:

a mobile digital radio receiver for receiving and playing a current song;

a processor in the digital radio receiver that decodes metadata that identifies the current song;

a remote server system for maintaining a user account, the server system coupled to a data store for buffering said metadata in association with the user account;

means for transmitting the metadata of the current song over a wireless telecom voice channel using in-band signaling from the digital radio receiver to the remote server system for storage in the data store in association with the user account;

means for automatically establishing a voice call to a predetermined telephone number corresponding to the remote server system in response to decoding the metadata of the current song if a line corresponding to the transmitting means is available;

means for modulating the captured metadata for in-band transmission over the wireless telecom voice channel of the established voice call and forwarding said modulated representation of the captured metadata in-band over the wireless telecom voice channel of the established voice call;

means for queuing the captured metadata for a later transfer if the line is busy; and means for adding the metadata of the current song into a user playlist on user equipment 8. The mobile digital radio playlist system according to claim 7 wherein the means for transmitting the metadata of the current song from the digital radio receiver to the remote server system comprises a wireless telecommunications transceiver.

9. The mobile digital radio playlist system according to claim 8 wherein the wireless telecommunications transceiver comprises a hand-held cell phone coupled to the digital radio receiver.

10. The mobile digital radio playlist system according to claim 9 wherein the cell phone is coupled to the digital radio receiver by a wireless connection.

11. A method of updating a playlist stored on user equipment, the method comprising:

capturing metadata of a current song in a mobile digital radio receiver in response to a user capture input;

transmitting the captured metadata from the digital radio receiver to a wireless telecommunication device;

in the wireless telecommunication device, forwarding the captured metadata to a playlist server over a wireless telecom voice channel using in-band signaling;

automatically establishing a voice call to a predetermined telephone number corresponding to the playlist server in response to the user capture input if a line corresponding to the wireless telecommunication device is available;

modulating the captured metadata for in-band transmission over the wireless telecom voice channel of the established voice call and forwarding said modulated representation of the captured metadata in-band over the wireless telecom voice channel of the established voice call;

if the line is busy, queuing the captured metadata for a later transfer;

in the playlist server, forwarding the received metadata to the user equipment to update the playlist; and sending location data indicative of a current location of the mobile digital radio receiver to the playlist server together with the captured metadata.

12. The method according to claim 11 and further including acquiring the said location data from a GPS receiver.

13. The method according to claim 12 wherein the GPS receiver is integrated into the wireless telecommunication device.

* * * * *